United States Patent
Natsui et al.

(10) Patent No.: US 11,637,277 B2
(45) Date of Patent: *Apr. 25, 2023

(54) POSITIVE-ELECTRODE ACTIVE MATERIAL AND BATTERY

(71) Applicant: PANASONIC INTELLECTUAL PROPERTY MANAGEMENT CO., LTD., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 152 days.

This patent is subject to a terminal disclaimer.

(21) Appl. No.: 17/028,424

(22) Filed: Sep. 22, 2020

(65) Prior Publication Data

US 2021/0005884 A1 Jan. 7, 2021

Related U.S. Application Data

(63) Continuation of application No. 15/811,685, filed on Nov. 14, 2017, now Pat. No. 10,818,910, which is a continuation of application No. PCT/JP2016/003215, filed on Jul. 6, 2016.

(30) Foreign Application Priority Data

Jul. 23, 2015 (JP) .............................. JP2015-145485

(51) Int. Cl.
| | |
|---|---|
| H01M 4/1315 | (2010.01) |
| H01M 4/505 | (2010.01) |
| H01M 4/525 | (2010.01) |
| H01M 10/052 | (2010.01) |
| H01M 10/0566 | (2010.01) |
| C01G 51/00 | (2006.01) |
| C01G 45/00 | (2006.01) |
| C01G 53/00 | (2006.01) |
| H01M 4/485 | (2010.01) |
| H01M 10/0525 | (2010.01) |
| H01M 4/02 | (2006.01) |

(52) U.S. Cl.
CPC ........ *H01M 4/1315* (2013.01); *C01G 45/006* (2013.01); *C01G 51/006* (2013.01); *C01G 53/006* (2013.01); *H01M 4/485* (2013.01); *H01M 4/505* (2013.01); *H01M 4/525* (2013.01); *H01M 10/052* (2013.01); *H01M 10/0525* (2013.01); *H01M 10/0566* (2013.01); *C01P 2002/54* (2013.01); *C01P 2002/76* (2013.01); *C01P 2006/40* (2013.01); *H01M 2004/028* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 10,497,928 B2 * | 12/2019 | Asano | H01M 4/525 |
| 10,811,671 B2 * | 10/2020 | Natsui | H01M 4/505 |
| 10,811,672 B2 * | 10/2020 | Nakatsutsumi | H01M 4/525 |
| 10,811,673 B2 * | 10/2020 | Sasaki | H01M 4/505 |
| 10,818,910 B2 * | 10/2020 | Natsui | H01M 4/505 |
| 10,818,911 B2 * | 10/2020 | Natsui | H01M 4/525 |
| 10,818,912 B2 * | 10/2020 | Nakatsutsumi | H01M 4/525 |
| 10,833,315 B2 * | 11/2020 | Nakatsutsumi | H01M 4/505 |
| 10,833,316 B2 * | 11/2020 | Suzuki | H01M 4/525 |
| 10,833,317 B2 * | 11/2020 | Natsui | H01M 4/505 |
| 10,833,322 B2 * | 11/2020 | Natsui | H01M 4/131 |
| 10,840,499 B2 * | 11/2020 | Ikeuchi | H01M 4/505 |
| 10,854,876 B2 * | 12/2020 | Ikeuchi | H01M 4/525 |
| 11,043,661 B2 * | 6/2021 | Ishikawa | H01M 4/525 |
| 11,081,687 B2 * | 8/2021 | Natsui | H01M 4/525 |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |

(Continued)

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

Written Opinion for Japanese Patent Application No. 2017-540475, dated Sep. 1, 2020; with English translation.
Notice of Allowance issued in U.S. Appl. No. 15/702,632, dated Apr. 20, 2020.
Notice of Allowance issued in U.S. Appl. No. 15/813,218, dated May 4, 2020.

(Continued)

*Primary Examiner* — Laura Weiner
(74) *Attorney, Agent, or Firm* — McDermott Will & Emery LLP

(57) ABSTRACT

A positive-electrode active material containing a compound that has a crystal structure belonging to the space group FM-3M and is represented by the composition formula (1):

$$\text{Li}_x\text{Me}_y\text{O}_\alpha\text{F}_\beta \qquad (1)$$

wherein Me denotes one or two or more elements selected from the group consisting of Mn, Co, Ni, Fe, and Al, and the following conditions are satisfied.
$1.3 \leq x \leq 2.2$,
$0.8 \leq y \leq 1.3$,
$1 \leq \alpha \leq 2.93$,
$0.07 \leq \beta \leq 2$.

12 Claims, 2 Drawing Sheets

(56) References Cited

U.S. PATENT DOCUMENTS

| | | |
|---|---|---|
| 2010/0086854 A1 | 4/2010 | Kumar et al. |
| 2011/0247321 A1 | 10/2011 | Streeter et al. |
| 2011/0294019 A1 | 12/2011 | Amine et al. |
| 2013/0136987 A1 | 5/2013 | Uehara et al. |
| 2013/0209871 A1 | 8/2013 | Kato et al. |
| 2013/0266868 A1 | 10/2013 | Sun et al. |
| 2014/0099549 A1 | 4/2014 | Ceder et al. |
| 2014/0127583 A1 | 5/2014 | Han et al. |
| 2014/0162127 A1 | 6/2014 | Kim et al. |
| 2014/0205913 A1 | 7/2014 | Park et al. |
| 2014/0272607 A1 | 9/2014 | Amine et al. |
| 2015/0010819 A1 | 1/2015 | Lee et al. |
| 2015/0090924 A1 | 4/2015 | Lee et al. |
| 2015/0093646 A1 | 4/2015 | Kawada |
| 2015/0214550 A1 | 7/2015 | Song et al. |
| 2015/0228970 A1 | 8/2015 | Song et al. |
| 2015/0380768 A1 | 12/2015 | Mizuno et al. |
| 2016/0013517 A1 | 1/2016 | Nakazawa et al. |
| 2016/0049640 A1 | 2/2016 | Takeuchi et al. |
| 2016/0372747 A1 | 12/2016 | Rolff et al. |
| 2017/0005332 A1 | 1/2017 | Chen et al. |
| 2017/0207444 A1 | 7/2017 | Yanagihara et al. |
| 2019/0088940 A1 | 3/2019 | Ceder et al. |

FOREIGN PATENT DOCUMENTS

| | | |
|---|---|---|
| JP | H01-209663 A | 8/1989 |
| JP | H07-037617 A | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

Notice of Allowance issued in U.S. Appl. No. 15/813,212, dated May 1, 2020.

Notice of Allowance issued in U.S. Appl. No. 15/814,874, dated May 4, 2020.

CSD Details on Search Result for Li2 (Mn O3), printed on Feb. 4, 2020.

Coban, Hüseyin Can Çoban, "Metal Oxide (SnO2) Modified LiNi0.8Co0.2O2 Cathode Material for Lithium ION Batteries," M.Sc. Thesis, Department of Nano Science and Nano Engineering, Nano Science and Nano Engineering Programme, Istanbul Technical University Graduate School of Science Engineering and Technology. May 2014.

The Extended European Search Report dated Jun. 1, 2018 for the related European Patent Application No. 16827416.5.

Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.

International Search Report of PCT application No. PCT/JP2016/003215 dated Sep. 20, 2016.

International Search Report of PCT application No. PCT/JP2017/027997 dated Sep. 26, 2017.

International Search Report of PCT application No. PCT/JP2016/003954 dated Dec. 6, 2016.

International Search Report of PCT application No. PCT/JP2016/003949 dated Nov. 29, 2016.

International Search Report of PCT application No. PCT/JP2016/003955 dated Dec. 6, 2016.

International Search Report of PCT application No. PCT/JP2016/003948 dated Nov. 29, 2016.

International Search Report of PCT application No. PCT/JP2016/003952 dated Nov. 1, 2016.

International Search Report of PCT application No. PCT/JP2016/003953 dated Dec. 6, 2016.

International Search Report of PCT application No. PCT/JP2016/003951 dated Nov. 1, 2016.

International Search Report of PCT application No. PCT/JP2016/003950 dated Nov. 29, 2016.

International Search Report of PCT application No. PCT/JP2017/026210 dated Oct. 17, 2017.

M. Holzapfel et al., "Lithium-Ion Conductors of the System LiCo1—xFexO2, Preparation and Structural Investigation," Journal of Solid State Chemistry, 2001, 156, pp. 470-479.

S. Muhammad et al., "Deciphering the thermal behavior of lithium rich cathode material by in situ X-ray diffraction technique," Journal of Power Sources, 2015, 285, pp. 156-160.

International Search Report of PCT application No. PCT/JP2016/003956 dated Dec. 6, 2016.

Non-Final Office Action issued in U.S. Appl. No. 15/821,749, dated Jan. 16, 2020.

Notice of Allowance issued in U.S. Appl. No. 15/821,749, dated Apr. 15, 2020.

Non-Final Office Action issued in U.S. Appl. No. 15/821,745, dated Dec. 10, 2019.

Notice of Allowance issued in U.S. Appl. No. 15/821,745, dated Apr. 8, 2020.

Non-Final Office Action issued in U.S. Appl. No. 15/813,210, dated Jan. 2, 2020.

Non-Final Office Action issued in U.S. Appl. No. 15/813,204, dated Dec. 17, 2019.

Notice of Allowance issued in U.S. Appl. No. 15/813,204, dated Apr. 9, 2020.

Non-Final Office Action issued in U.S. Appl. No. 15/814,874, dated Jan. 2, 2020.

Non-Final Office Action issued in U.S. Appl. No. 15/811,685, dated Dec. 3, 2019.

Notice of Allowance issued in U.S. Appl. No. 15/811,685, dated Apr. 9, 2020.

Non-Final Office Action issued in U.S. Appl. No. 16/278,701, dated Aug. 27, 2019.

Non-Final Office Action issued in U.S. Appl. No. 16/278,701, dated Dec. 10, 2019.

Final Office Action issued in U.S. Appl. No. 16/278,701, dated Apr. 16, 2020.

Non-Final Office Action issued in U.S. Appl. No. 15/813,212, dated Dec. 31, 2019.

(56) References Cited

OTHER PUBLICATIONS

Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.
Non-Final Office Action issued in U.S. Appl. No. 15/838,360, dated Apr. 22, 2020.
Notice of Allowance issued in U.S. Appl. No. 15/813,210, dated Apr. 22, 2020.
Shuhua Ren et al., Improved Voltage and Cycling for Intercalation in High-Capacity Disordered Oxyfluoride Cathodes, Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of $LiNiO_2$—$LiTiO_2$—$Li[Li1/3Ti2/3]O_2$, Lianqi Zhang, et al Journal of power Sourses, 185(2008), P534-P541.

* cited by examiner

POSITIVE-ELECTRODE ACTIVE MATERIAL AND BATTERY

CROSS-REFERENCE OF RELATED APPLICATIONS

This application is a Continuation of U.S. patent application Ser. No. 15/811,685, filed on Nov. 14, 2017, now U.S. Pat. No. 10,818,910, which is a Continuation of International Patent Application No. PCT/JP2016/003215, filed on Jul. 6, 2016, which in turn claims the benefit of Japanese Application No. 2015-145485, filed on Jul. 23, 2015, the entire disclosures of which Applications are incorporated by reference herein.

BACKGROUND

1. Technical Field

The present disclosure relates to a positive-electrode active material for use in batteries and to a battery.

2. Description of the Related Art

Japanese Unexamined Patent Application Publication No. 7-037617 discloses a positive-electrode active material that has a crystal structure belonging to the space group R3-M and is represented by the formula $Li_wM_xO_yX_z$ (M denotes Co, Ni, Mn, V, Fe, or Ti, X denotes at least one halogen element, $0.2 \leq w \leq 2.5$, $0.8 \leq x \leq 1.25$, $1 \leq y \leq 2$, $0 < z \leq 1$).

SUMMARY

In the related art, there is a demand for high-capacity batteries.

In one general aspect, the techniques disclosed here feature a positive-electrode active material containing a compound that has a crystal structure belonging to the space group FM-3M and that is represented by the composition formula (1).

$$Li_xMe_yO_\alpha F_\beta \qquad (1)$$

wherein Me denotes one or two or more elements selected from the group consisting of Mn, Co, Ni, Fe, and Al, and the following conditions are satisfied.
$1.3 \leq x \leq 2.2$
$0.8 \leq y \leq 1.3$
$1 \leq \alpha \leq 2.93$
$0.07 \leq \beta \leq 2$ The present disclosure can provide a high-capacity battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
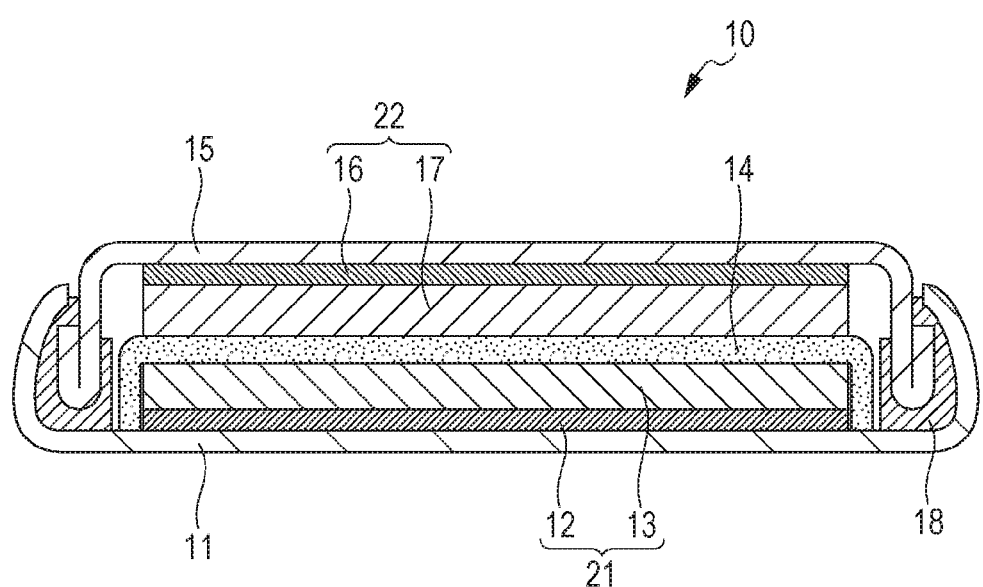
FIG. 1 is a schematic cross-sectional view of a battery of a second embodiment.

Embodiments of the present disclosure will be described below.

First Embodiment

A positive-electrode active material of a first embodiment contains a compound that has a crystal structure belonging to the space group FM-3M and that is represented by the composition formula (1).

$$Li_xMe_yO_\alpha F_\beta \qquad (1)$$

wherein Me denotes at least one selected from the group consisting of Mn, Co, Ni, Fe, and Al (that is, one or two or more elements selected from the group).

In the positive-electrode active material of the first embodiment, the compound satisfies the following conditions in the composition formula (1).
$1.3 \leq x \leq 2.2$
$0.8 \leq y \leq 1.3$
$1 \leq \alpha \leq 2.93$
$0.07 \leq \beta \leq 2$ Such an embodiment can provide a high-capacity battery.

For example, a lithium-ion battery containing a positive-electrode active material containing the compound has an oxidation-reduction potential (vs. $Li/Li^+$) of approximately 3.3 V and a capacity of approximately 220 mAh/g or more.

In the composition formula (1), x of less than 1.3 indicates that the compound has a decreased amount of available Li and insufficient capacity.

In the composition formula (1), x of more than 2.2 (or y of less than 0.8) indicates decreased utilization of an oxidation-reduction reaction of an available transition metal in the compound. This results in increased utilization of an oxidation-reduction reaction of oxygen. This destabilizes the crystal structure and results in insufficient capacity.

In the composition formula (1), $\alpha$ of less than 1 (or $\beta$ of more than 2) indicates that the effects of highly electronegative F on the compound increase. This results in decreased electron conductivity and insufficient capacity.

In the composition formula (1), $\alpha$ of more than 2.93 (or $\beta$ of less than 0.07) indicates that the effects of highly electronegative F on the compound decrease. This decreases cation-anion interaction. This destabilizes the structure when Li is desorbed and therefore results in insufficient capacity.

In the positive-electrode active material of the first embodiment, a compound represented by the composition formula (1) has a crystal structure belonging to the space group FM-3M (rock-salt-type crystal structure).

In the composition formula (1), the ratio of Li to Me is represented by $\{Li_x/Me_y\}$.

By way of example, the case where $1.7 \leq x \leq 2.2$ and $0.8 \leq y \leq 1.3$ is described below.

In this case, the ratio of Li to Me is theoretically $1.3 \leq \{Li_x/Me_y\} \leq 2.75$ and is more than 1.

The number of Li atoms per Me atom is larger than that for a known positive-electrode active material, for example, $LiMnO_2$.

In a compound represented by the composition formula (1), Li and Me are probably located at the same site.

Thus, a compound represented by the composition formula (1) can intercalate and deintercalate more Li per Me atom than a known positive-electrode active material, for example, $LiMnO_2$.

Thus, the positive-electrode active material of the first embodiment is suitable for high-capacity lithium-ion batteries.

Upon abstraction of much Li, a layered structure specified by the space group R3-M cannot hold the layers and disintegrates.

By contrast, a rock-salt-type crystal structure specified by the space group FM-3M, such as a compound according to the present disclosure, can stably maintain the structure without disintegration, even after abstraction of much Li. Thus, a high-capacity battery can be provided.

The compound may constitute 90% or more by weight of the positive-electrode active material of the first embodiment.

Such an embodiment can provide a higher-capacity battery.

In addition to the compound, the positive-electrode active material of the first embodiment may contain incidental impurities, or starting materials for the synthesis of the compound, by-products, and degradation products.

The compound may constitute 100% by weight of the positive-electrode active material of the first embodiment except incidental impurities.

Such an embodiment can provide a higher-capacity battery.

In the positive-electrode active material of the first embodiment, the compound may satisfy $0.8 \leq (x+y)/(\alpha+\beta) \leq 1$ in the composition formula (1).

Such an embodiment can provide a higher-capacity battery.

In the positive-electrode active material of the first embodiment, the compound may satisfy $2.5/3 \leq (x+y)/(\alpha+\beta) \leq 2.6/3$ in the composition formula (1).

Such an embodiment can provide a higher-capacity battery.

In the positive-electrode active material of the first embodiment, the compound may satisfy $2.83 < \{2\alpha+\beta-(3-y)\}/y$ in the composition formula (1).

Such an embodiment can provide a higher-capacity battery.

In the positive-electrode active material of the first embodiment, Me in the composition formula (1) may be one element selected from Mn, Co, Ni, and Fe, a solid solution composed of Ni, Co, and Mn, a solid solution composed of Ni, Co, and Al, a solid solution composed of Mn and Co, or a solid solution composed of Mn and Ni.

Such an embodiment can provide a higher-capacity battery.

In the positive-electrode active material of the first embodiment, the compound may satisfy $1.79 \leq x \leq 2.18$ in the composition formula (1).

Such an embodiment can provide a higher-capacity battery.

In the positive-electrode active material of the first embodiment, the compound may satisfy $1.89 \leq x \leq 2$ in the composition formula (1).

Such an embodiment can provide a higher-capacity battery.

In the positive-electrode active material of the first embodiment, the compound may satisfy $0.5 \leq \beta$ in the composition formula (1).

Such an embodiment can provide a battery with better cycle characteristics. In the composition formula (1), $\beta$ of less than 0.5 (that is, a small amount of fluorine) indicates that more oxygen in the compound is involved in a redox reaction. Thus, the structure is likely to become unstable due to desorption of oxygen. This tends to result in poor cycle characteristics.

In the positive-electrode active material of the first embodiment, the compound may satisfy $0.79 \leq \beta \leq 1$ in the composition formula (1).

Such an embodiment can provide a higher-capacity battery.

<Method for Producing Compound>

An exemplary method for producing the compound of the positive-electrode active material of the first embodiment will be described below.

A compound represented by the composition formula (1) can be produced by the method described below, for example.

A raw material containing Li, a raw material containing F, and a raw material containing Me are prepared. Examples of the raw material containing Li include oxides, such as $Li_2O$ and $Li_2O_2$, salts, such as LiF, $Li_2CO_3$, and LiOH, and lithium composite transition metal oxides, such as $LiMeO_2$ and $LiMe_2O_4$. Examples of the raw material containing F include LiF and transition metal fluorides. Examples of the raw material containing Me include oxides with various oxidation states, such as $Me_2O_3$, salts, such as $MeCO_3$ and $MeNO_3$, hydroxides, such as $Me(OH)_2$ and MeOOH, and lithium composite transition metal oxides, such as $LiMeO_2$ and $LiMe_2O_4$. In the case that Me is Mn, examples of the raw material containing Mn include manganese oxides with various oxidation states, such as $Mn_2O_3$, salts, such as $MnCO_3$ and $MnNO_3$, hydroxides, such as $Mn(OH)_2$ and MnOOH, and lithium composite transition metal oxides, such as $LiMnO_2$ and $LiMn_2O_4$.

These raw materials are weighed at the mole ratio of the composition formula (1).

The variables "x, y, $\alpha$, and $\beta$" in the composition formula (1) can be altered in the ranges described for the composition formula (1).

The weighed raw materials are mixed, for example, by a dry process or a wet process and are allowed to react mechanochemically for 10 hours or more to produce a compound represented by the composition formula (1). For example, a mixing apparatus, such as a ball mill, may be used.

The raw materials and the conditions for mixing a mixture of the raw materials can be adjusted to produce a compound substantially represented by the composition formula (1).

The use of a lithium transition metal composite oxide as a precursor can decrease the energy for mixing elements. Thus, a compound represented by the composition formula (1) can be produced with higher purity.

The composition of a compound represented by the composition formula (1) thus produced can be determined by ICP spectroscopy and an inert gas fusion-infrared absorption method, for example.

A compound represented by the composition formula (1) can be identified by determining the space group of the crystal structure by powder X-ray analysis.

Thus, a method for producing a positive-electrode active material according to one aspect of the first embodiment includes (a) a step of preparing the raw materials and (b) a step of mechanochemically reacting the raw materials to produce the positive-electrode active material.

The step (a) may include a step of mixing a raw material containing Li and F and a raw material containing Me at a Li/Me mole ratio in the range of 1.31 to 2.33 to prepare a raw material mixture.

The step (a) may include a step of producing a raw material, a lithium transition metal composite oxide, by a known method.

The step (a) may include a step of mixing the raw materials at a Li/Me mole ratio in the range of 1.7 to 2.0 to prepare a raw material mixture.

The step (b) may include a step of mechanochemically reacting the raw materials in a ball mill.

Thus, a compound represented by the composition formula (1) may be synthesized by mechanochemically reacting a precursor (for example, LiF, $Li_2O$, a transition metal oxide, a lithium composite transition metal, etc.) in a planetary ball mill.

The mixing ratio of the precursor can be adjusted to introduce more Li atoms.

When the precursor is reacted by a solid phase method, the precursor is decomposed into more stable compounds.

Thus, a compound that has a crystal structure belonging to the space group FM-3M and is represented by the composition formula (1) cannot be produced by a method for reacting the precursor by a solid phase method.

Second Embodiment

A second embodiment will be described below. The contents described in the first embodiment are appropriately omitted to avoid overlap.

A battery of the second embodiment includes a positive electrode containing the positive-electrode active material of the first embodiment, a negative electrode, and an electrolyte.

Such an embodiment can provide a high-capacity battery.

More specifically, as described in the first embodiment, the positive-electrode active material contains many Li atoms per Me atom. Thus, a high-capacity battery can be provided.

The battery of the second embodiment may be a lithium-ion secondary battery or a non-aqueous electrolyte secondary battery, for example.

In the battery of the second embodiment, the positive electrode may have a positive-electrode active material layer. The positive-electrode active material layer may contain the positive-electrode active material of the first embodiment (the compound of the first embodiment) as a main component (that is, 50% or more by weight (50 wt % or more) of the positive-electrode active material layer).

Such an embodiment can provide a higher-capacity battery.

Alternatively, the positive-electrode active material layer in the battery of the second embodiment may contain the positive-electrode active material of the first embodiment (the compound of the first embodiment) constituting 70% or more by weight (70 wt % or more) of the positive-electrode active material layer.

Such an embodiment can provide a higher-capacity battery.

Alternatively, the positive-electrode active material layer in the battery of the second embodiment may contain the positive-electrode active material of the first embodiment (the compound of the first embodiment) constituting 90% or more by weight of the positive-electrode active material layer (90 wt % or more).

Such an embodiment can provide a higher-capacity battery.

In the battery of the second embodiment, for example, the negative electrode may contain a negative-electrode active material that can adsorb and desorb lithium (for example, a negative-electrode active material with lithium adsorption and desorption characteristics).

In the battery of the second embodiment, for example, the electrolyte may be a non-aqueous electrolyte (for example, a non-aqueous electrolyte solution).

FIG. 1 is a schematic cross-sectional view of a battery 10 of the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution).

The positive electrode 21, the negative electrode 22, and the separator 14 constitute an electrode group.

The electrode group is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, aluminum alloy, etc.), for example.

The positive-electrode current collector 12 may be omitted, and the case 11 may be used as a positive-electrode current collector.

The positive-electrode active material layer 13 contains the positive-electrode active material of the first embodiment.

If necessary, the positive-electrode active material layer 13 may contain an additive agent (electrically conductive agent, ionic conduction aid, binder, etc.).

The negative electrode 22 includes a negative-electrode current collector 16 and a negative-electrode active material layer 17 disposed on the negative-electrode current collector 16.

The negative-electrode current collector 16 is formed of a metallic material (aluminum, stainless steel, aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (electrically conductive agent, ionic conduction aid, binder, etc.).

The negative-electrode active material may be a metallic material, carbon material, oxide, nitride, tin compound, or silicon compound.

The metallic material may be a single metal or an alloy. Examples of the metallic material include lithium metals and lithium alloys.

Examples of the carbon material include natural graphite, coke, carbon under graphitization, carbon fiber, spherical carbon, artificial graphite, and amorphous carbon.

From the perspective of capacity density, silicon (Si), tin (Sn), silicon compounds, and tin compounds can be suitably used. Silicon compounds and tin compounds may be alloys and solid solutions.

Examples of the silicon compounds include $SiO_x$ (wherein $0.05<x<1.95$). Compounds (alloys and solid solutions) produced by substituting another element for part of silicon of $SiO_x$ may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. One tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (adsorb) lithium by any method. More specifically, the method may be (a) a method for depositing lithium on the negative-electrode active material layer 17 by a gas phase method, such as a vacuum evaporation method, or (b) a method for heating a lithium metal foil in contact with the negative-electrode active material layer 17. In these methods, lithium can be diffused into the negative-electrode active material layer 17 by heat. Alternatively, lithium may be electrochemically adsorbed on the negative-electrode active material layer 17. More specifically, a battery is assembled from the negative electrode 22 free of lithium and a lithium metal foil (positive electrode). Subsequently, the battery is charged to adsorb lithium on the negative electrode 22.

Examples of the binder for the positive electrode 21 and the negative electrode 22 include poly(vinylidene difluoride), polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 μm (or 10 to 40 μm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvent include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

The non-aqueous solvent may be one non-aqueous solvent selected from these. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these. Alternatively, the lithium salt may be a mixture of two or more lithium salts selected from these. The concentration of the lithium salt ranges from 0.5 to 2 mol/liter, for example.

The battery of the second embodiment may be of various types, such as coin type, cylindrical type, square or rectangular type, sheet type, button type, flat type, or layered type.

Third Embodiment

A third embodiment will be described below. The contents described in the first or second embodiment are appropriately omitted to avoid overlap.

A positive-electrode active material of the third embodiment contains a compound represented by the composition formula (1).

In the composition formula (1), Me denotes at least one selected from the group consisting of Mn, Co, Ni, Fe, and Al (that is, one or two or more elements selected from the group).

In the positive-electrode active material of the third embodiment, the compound satisfies the following conditions in the composition formula (1).

$1.3 \leq x \leq 2.2$
$0.8 \leq y \leq 1.3$
$1 \leq \alpha \leq 2.93$
$0.07 \leq \beta \leq 2$ Such an embodiment can provide a high-capacity battery.

In the positive-electrode active material of the third embodiment, the compound may satisfy $0.8 \leq (x+y)/(\alpha+\beta) \leq 1$ in the composition formula (1).

Such an embodiment can provide a higher-capacity battery.

In the positive-electrode active material of the third embodiment, the compound may satisfy $2.5/3 \leq (x+y)/(\alpha+\beta) \leq 2.6/3$ in the composition formula (1).

Such an embodiment can provide a higher-capacity battery.

In the positive-electrode active material of the third embodiment, the compound may satisfy $2.83 < \{2\alpha+\beta-(3-y)\}/y$ in the composition formula (1).

Such an embodiment can provide a higher-capacity battery.

In the positive-electrode active material of the third embodiment, Me in the composition formula (1) may be one element selected from Mn, Co, Ni, and Fe, a solid solution composed of Ni, Co, and Mn, a solid solution composed of Ni, Co, and Al, a solid solution composed of Mn and Co, or a solid solution composed of Mn and Ni.

Such an embodiment can provide a higher-capacity battery.

In the positive-electrode active material of the third embodiment, the compound may satisfy $1.79 \leq x \leq 2.18$ in the composition formula (1).

Such an embodiment can provide a higher-capacity battery.

In the positive-electrode active material of the third embodiment, the compound may satisfy $1.89 \leq x \leq 2$ in the composition formula (1).

Such an embodiment can provide a higher-capacity battery.

In the positive-electrode active material of the third embodiment, the compound may satisfy $0.5 \leq \beta$ in the composition formula (1).

Such an embodiment can provide a battery with better cycle characteristics. In the composition formula (1), $\beta$ of less than 0.5 (that is, a small amount of fluorine) indicates that more oxygen in the compound is involved in a redox reaction. Thus, the structure is likely to become unstable due to desorption of oxygen. This tends to result in poor cycle characteristics.

In the positive-electrode active material of the third embodiment, the compound may satisfy $0.79 \leq \beta \leq 1$ in the composition formula (1).

Such an embodiment can provide a higher-capacity battery.

A positive electrode containing the positive-electrode active material of the third embodiment, a negative electrode, and an electrolyte may constitute a battery.

Such an embodiment can provide a high-capacity battery.

EXAMPLES

Example 1

[Production of Positive-Electrode Active Material]

LiF and LiMnO2 were weighed at a mole ratio of LiF/$LiMnO_2$=1.0/1.0.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

Figure 2:
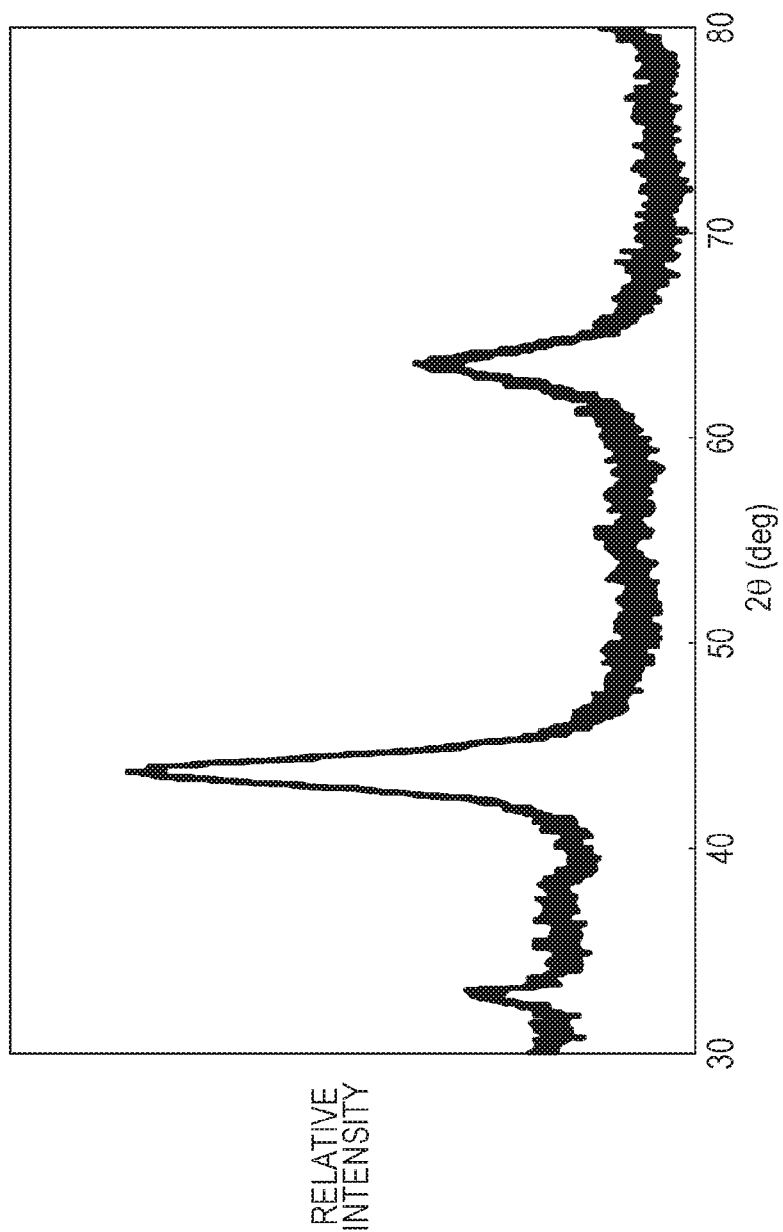
FIG. 2 is an X-ray powder diffraction chart of a positive-electrode active material of Example 1.

FIG. 2 shows the results.

The space group of the compound was FM-3M.

The composition of the compound was determined by ICP spectroscopy and inert gas fusion-infrared absorption.

The composition of the compound was $Li_2MnO_2F$.

[Production of Battery]

70 parts by mass of the compound, 20 parts by mass of an electrically conductive agent, 10 parts by mass of poly (vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode plate with a positive-electrode active material layer. The positive-electrode plate had a thickness of 60 μm.

A circular positive electrode 12.5 mm in diameter was punched out from the positive-electrode plate.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/liter in the non-aqueous solvent to prepare a non-aqueous electrolyte solution.

A separator (manufactured by Celgard, LLC., product number 2320, 25 μm in thickness) was impregnated with the non-aqueous electrolyte solution.

Celgard (registered trademark) 2320 is a 3-layer separator composed of a polypropylene layer, a polyethylene layer, and a polypropylene layer.

A CR2032 coin-type battery was assembled from the positive electrode, the negative electrode, and the separator in a dry box maintained at a dew point of −50° C.

Examples 2 to 18

The Li/Me ratio and the O/F ratio were changed from those described in Example 1.

Table 1 lists the precursors for the production of positive-electrode active materials of Examples 2 to 18 and the compositions of the positive-electrode active materials thus synthesized.

Except for these, the positive-electrode active materials of Examples 2 to 18 were synthesized in the same manner as in Example 1.

The precursors of Examples 2 to 18 were weighed at the stoichiometric ratio and were mixed in the same manner as in Example 1. For example, in Example 2, the precursors were weighed at a mole ratio of $Li_2O/LiF/Mn_2O_3$=1/2/1.

Coin-type batteries of Examples 2 to 18 were produced from the positive-electrode active materials of Examples 2 to 18 in the same manner as in Example 1.

Comparative Example 1

LiF and $LiMnO_2$ were weighed at a mole ratio of LiF/$LiMnO_2$=1.0/1.0.

The raw material mixture was fired in an inert gas atmosphere at 800° C. Thus, particles of a lithium manganese composite compound ($Li_2MnO_2F$) were formed.

The space group of the lithium manganese composite compound particles was R3-M.

A coin-type battery of Comparative Example 1 was produced in the same manner as in Example 1 by using the lithium manganese composite compound particles as a positive-electrode active material.

Comparative Example 2

Lithium cobalt oxide ($LiCoO_2$) was produced by a known method.

The space group of the lithium cobalt oxide was R3-M.

A coin-type battery of Comparative Example 2 was produced in the same manner as in Example 1 by using the lithium cobalt oxide as a positive-electrode active material.

Comparative Examples 3 and 4

The precursors for the production of a positive-electrode active material, the Li/Me ratio, and the O/F ratio were changed from those described in Comparative Example 1.

Table 1 lists the precursors for the production of positive-electrode active materials of Comparative Examples 3 and 4 and the compositions of the positive-electrode active materials thus synthesized.

Except for these, the positive-electrode active materials of Comparative Examples 3 and 4 were synthesized in the same manner as in Comparative Example 1.

The precursors of Comparative Examples 3 and 4 were weighed at the stoichiometric ratio and were mixed in the same manner as in Example 1.

The space group of the lithium manganese composite compound particles thus produced was R3-M.

Coin-type batteries of Comparative Examples 3 and 4 were produced in the same manner as in Example 1 by using the lithium manganese composite compound particles as a positive-electrode active material.

<Evaluation of Battery>

The electric current density on the positive electrode was set at 0.005 $mA/cm^2$, and the battery of Example 1 was charged to a voltage of 5.2 V.

Subsequently, the discharge cut-off voltage was set at 1.5 V, and the battery of Example 1 was discharged at an electric current density of 0.05 $mA/cm^2$.

The initial discharge capacity was 343 mAh/g.

The electric current density on the positive electrode was set at 0.05 $mA/cm^2$, and the battery of Comparative Example 1 was charged to a voltage of 5.2 V.

Subsequently, the discharge cut-off voltage was set at 1.5 V, and the battery of Comparative Example 1 was discharged at an electric current density of 0.005 $mA/cm^2$.

The initial discharge capacity of the battery of Comparative Example 1 was 130 mAh/g.

The electric current density on the positive electrode was set at 0.05 $mA/cm^2$, and the battery of Comparative Example 2 was charged to a voltage of 4.3 V.

Subsequently, the discharge cut-off voltage was set at 2.5 V, and the battery of Comparative Example 2 was discharged at an electric current density of 0.005 $mA/cm^2$.

The initial discharge capacity of the battery of Comparative Example 2 was 145 mAh/g.

The capacities of the coin-type batteries of Comparative Examples 3 and 4 were measured in the same manner as in Comparative Example 2.

The capacities of the coin-type batteries of Examples 2 to 18 were measured in the same manner as in Example 1. Table 1 shows the results.

Table 1 lists "$(x+y)/(\alpha+\beta)$", which indicates deficiency, "$\{2\alpha+\beta-(3-y)\}/y$", which indicates the Me valence, and "$(4y-\beta)/\alpha$", which indicates the valence of oxygen after change, for each sample.

TABLE 1

| Sample | Precursor | Composition | Space group | $(x + y)/(\alpha + \beta)$ | $\{2\alpha + \beta - (3 - y)\}/y$ | $(4y - \beta)/\alpha$ | initial discharge capacity mAh/g |
|---|---|---|---|---|---|---|---|
| Example 1 | LiF—$LiMnO_2$ | $Li_2MnO_2F$ | FM-3M | 1 | 3.00 | 1.50 | 343 |
| Example 2 | $Li_2O$—LiF—$Mn_2O_3$ | $Li_2MnO_2F$ | FM-3M | 1 | 3.00 | 1.50 | 323 |
| Example 3 | $Li_2O$—LiF—$Mn_2O_3$ | $Li_{2.18}Mn_{0.82}O_{1.6}F_{1.4}$ | FM-3M | 1 | 2.95 | 1.18 | 233 |
| Example 4 | $Li_2O$—LiF—$Mn_2O_3$ | $Li_{1.34}Mn_{1.06}O_{2.12}F_{0.88}$ | FM-3M | 1 | 3.00 | 1.58 | 315 |
| Example 5 | $Li_2O$—LiF—$Mn_2O_3$ | $Li_{1.89}Mn_{1.11}O_{2.21}F_{0.79}$ | FM-3M | 1 | 2.99 | 1.65 | 323 |
| Example 6 | $Li_2O$—LiF—$Mn_2O_3$ | $Li_{1.79}Mn_{1.21}O_{2.42}F_{0.58}$ | FM-3M | 1 | 3.00 | 1.76 | 290 |
| Example 7 | $Li_2O$—LiF—MnO | $Li_2MnOF_2$ | FM-3M | 1 | 2.00 | 2.00 | 244 |
| Example 8 | $Li_2O$—LiF—MnO—$Mn_2O_3$ | $Li_2MnO_{1.5}F_{1.5}$ | FM-3M | 1 | 2.50 | 1.67 | 273 |
| Example 9 | $Li_2O$—LiF—$MnO_2$—$Mn_2O_3$ | $Li_2MnO_{2.5}F_{0.5}$ | FM-3M | 1 | 3.50 | 1.40 | 256 |
| Example 10 | $Li_2O$—LiF—$Fe_2O_3$ | $Li_2FeO_2F$ | FM-3M | 1 | 3.00 | 1.50 | 220 |
| Example 11 | LiF—$LiCoO_2$ | $Li_2CoO_2F$ | FM-3M | 1 | 3.00 | 1.50 | 249 |
| Example 12 | LiF—$LiNiO_2$ | $Li_2NiO_2F$ | FM-3M | 1 | 3.00 | 1.50 | 282 |
| Example 13 | LiF—$LiNi_{0.33}Co_{0.33}Mn_{0.33}O_2$ | $Li_2Ni_{0.33}Co_{0.33}Mn_{0.33}O_2F$ | FM-3M | 1 | 3.00 | 1.50 | 274 |
| Example 14 | LiF—$LiNi_{0.85}Co_{0.01}Al_{0.05}O_2$ | $Li_2Ni_{0.85}Co_{0.1}Al_{0.05}O_2F$ | FM-3M | 1 | 3.00 | 1.50 | 285 |
| Example 15 | $Li_2O$—LiF—MnO—$Mn_2O_3$ | $Li_{1.8}Mn_{1.2}O_2F$ | FM-3M | 1 | 2.67 | 1.90 | 282 |
| Example 16 | $Li_2O$—LiF—$MnO_2$—$Mn_2O_3$ | $Li_{1.8}Mn_{1.2}O_{2.5}F_{0.5}$ | FM-3M | 1 | 3.08 | 1.72 | 326 |
| Example 17 | $Li_2O$—LiF—$MnO_2$—$Mn_2O_3$ | $Li_{1.8}Mn_{1.2}O_{2.93}F_{0.07}$ | FM-3M | 1 | 3.44 | 1.61 | 330 |
| Example 18 | $Li_2O$—LiF—$MnO_2$—$Mn_2O_3$ | $Li_{1.8}Mn_{1.2}O_{2.85}F_{0.15}$ | FM-3M | 1 | 3.38 | 1.63 | 320 |
| Comparative example 1 | LiF—$LiMnO_2$ | $Li_2MnO_2F$ | R3-M | 1 | 3.00 | 1.50 | 130 |
| Comparative example 2 | — | $LiCoO_2$ | R3-M | 1 | 2.00 | 2.00 | 145 |

TABLE 1-continued

| Sample | Precursor | Composition | Space group | $(x+y)/(\alpha+\beta)$ | $\{2\alpha+\beta-(3-y)\}/y$ | $(4y-\beta)/\alpha$ | initial discharge capacity mAh/g |
|---|---|---|---|---|---|---|---|
| Comparative example 3 | LiF—LiCoO$_2$ | LiCoO$_{1.95}$F$_{0.05}$ | R3-M | 1 | 1.95 | 2.03 | 143 |
| Comparative example 4 | LiF—LiCoO$_2$ | LiCoO$_{1.9}$F$_{0.1}$ | R3-M | 1 | 1.90 | 2.05 | 140 |

Table 1 shows that the initial discharge capacity of the batteries of Examples 1 to 18 ranged from 220 to 343 mAh/g.

The initial discharge capacities of the batteries of Examples 1 to 18 were larger than those of Comparative Examples 1 and 2.

The plausible reason for the larger initial discharge capacities in Examples 1 to 18 is that the crystal structure in Examples 1 to 18 contained more Li.

Table 1 also shows that the initial discharge capacity of the battery of Example 2 is smaller than that of Example 1.

The plausible reason for the smaller initial discharge capacity in Example 2 is that the presence of impurities in the synthesis resulted in high resistance.

Table 1 also shows that the initial discharge capacity of the battery of Example 3 is smaller than that of Example 1.

The plausible reason for the smaller initial discharge capacity in Example 3 is that the presence of more fluorine with low electronegativity resulted in lower electron conductivity and poor load characteristics.

Table 1 also shows that the initial discharge capacities of the batteries of Examples 4 to 6 are smaller than that of Example 1.

The plausible reason for the smaller initial discharge capacities in Examples 4 to 6 is that lower Li/Mn ratios in Examples 4 to 6 resulted in less lithium involved in charging and discharging.

Table 1 also shows that the initial discharge capacities of he batteries of Examples 7 and 8 are smaller than that of Example 1.

The plausible reason for the smaller initial discharge capacities in Examples 7 and 8 is that the presence of more fluorine with low electronegativity resulted in lower electron conductivity and poor load characteristics.

Table 1 also shows that the initial discharge capacity of the battery of Example 9 is smaller than that of Example 1.

The plausible reason for the smaller initial discharge capacity in Example 9 is that in addition to an oxidation-reduction reaction of Mn in the charge/discharge process an oxidation-reduction reaction of oxygen is more utilized and thereby destabilizes the crystal structure in the charge process.

Table 1 also shows that the initial discharge capacities of he batteries of Examples 10 and 11 are smaller than that of Example 1.

The plausible reason for the smaller initial discharge capacity in Examples 10 and 11 is that in addition to an oxidation-reduction reaction of Fe or Co in the charge/discharge process an oxidation-reduction reaction of oxygen is more utilized and thereby destabilizes the crystal structure in the charge process.

Table 1 also shows that the initial discharge capacity of the battery of Example 12 is smaller than that of Example 1.

The plausible reason for the smaller initial discharge capacity in Example 12 is that the transition metal species was Ni, and an oxidation-reduction reaction of oxygen was less utilized in the charge/discharge process.

Table 1 also shows that the initial discharge capacities of the batteries of Examples 13 and 14 are smaller than that of Example 1.

The plausible reason for the smaller initial discharge capacity in Examples 13 and 14 is that due to the addition of Ni and Co an oxidation-reduction reaction of oxygen was less utilized in the charge/discharge process.

Table 1 shows that x of more than 2.1 in the composition formula (1) (for example, x=2.18 in Example 3) resulted in an unstable crystal structure in the charging process. This resulted in decreased discharge capacity.

Table 1 also shows that x of less than 1.8 (for example, x=1.79 in Example 6) resulted in a Li/Me ratio of less than 2 and a decreased amount of Li involved in charging and discharging. This resulted in decreased discharge capacity.

The results show that x satisfying $1.89 \leq x \leq 2$ can result in increased discharge capacity.

Table 1 also shows that the initial discharge capacities of the batteries of Examples 15 and 16 are smaller than that of Example 1.

The plausible reason for this is that an increased amount of Mn in Examples 15 and 16 resulted in limited Li diffusion paths. Furthermore, in Example 15, a decrease in Me valence (Mn valence) possibly resulted in insufficient formation of a Mn-oxygen hybrid orbital and insufficient utilization of an oxidation-reduction reaction of oxygen.

Table 1 also shows that the initial discharge capacity of the battery of Example 16 is larger than that of Example 15.

The plausible reason for this is that the larger amount of oxygen in Example 16 than in Example 15 resulted in the formation of a Mn-oxygen hybrid orbital. Thus, an oxidation-reduction reaction of oxygen could be utilized to increase the capacity.

Examples 17 and 18 were inferior in cycle characteristics to Example 1.

The plausible reason for this is that the amount of fluorine in Examples 17 and 18 was small (that is, β was less than 0.5).

Examples 19 to 35

The Li/Me ratio and the O/F ratio were changed from those described in Example 1.

Table 2 lists the precursors for the production of positive-electrode active materials of Examples 19 to 35 and the compositions of the positive-electrode active materials thus synthesized.

Except for these, the positive-electrode active materials of Examples 19 to 35 were synthesized in the same manner as in Example 1.

The precursors of Examples 19 to 35 were weighed at the stoichiometric ratio and were mixed in the same manner as in Example 1.

Coin-type batteries were produced from the positive-electrode active materials of Examples 19 to 35 in the same manner as in Example 1.

The capacities of the coin-type batteries of Examples 19 to 35 were measured in the same manner as in Example 1. Table 2 shows the results.

Table 2 lists "$(x+y)/(\alpha+\beta)$", which indicates deficiency, "$\{2\alpha+\beta-(3-y)\}/y$", which indicates the Me valence, and "$(4y-\beta)/\alpha$", which indicates the valence of oxygen after change, for each sample.

The plausible reason for this is that more utilization of an oxidation-reduction reaction of oxygen in Example 22 than in Example 19 destabilized the structure.

Table 2 also shows that the initial discharge capacity of the battery of Example 23 is smaller than that of Example 19.

The plausible reason for this is that the addition of Ni in Example 23 made it difficult to utilize an oxidation-reduction reaction of oxygen in the charge/discharge process when compared with Example 19.

TABLE 2

| Sample | Precursor | Composition | Space group | $(x+y)/(\alpha+\beta)$ | $\{2\alpha+\beta-(3-y)\}/y$ | $(4y-\beta)/\alpha$ | Initial discharge capacity mAh/g |
|---|---|---|---|---|---|---|---|
| Example 19 | LiF—Li$_2$O—Mn$_2$O$_3$—MnO$_2$ | Li$_{1.4}$Mn$_{1.2}$O$_{2.5}$F$_{0.5}$ | FM-3M | 0.87 | 3.08 | 1.72 | 388 |
| Example 20 | LiF—Li$_2$O—Mn$_2$O$_3$—MnO$_2$—LiCoO$_2$ | Li$_{1.4}$MnCo$_{0.2}$O$_{2.5}$F$_{0.5}$ | FM-3M | 0.87 | 3.08 | 1.72 | 384 |
| Example 21 | LiF—Li$_2$O—Mn$_2$O$_3$—MnO$_2$ | Li$_{1.35}$Mn$_{1.25}$O$_{2.6}$F$_{0.4}$ | FM-3M | 0.87 | 3.08 | 1.77 | 373 |
| Example 22 | LiF—Li$_2$O—Mn$_2$O$_3$—MnO$_2$ | Li$_{1.4}$Mn$_{1.2}$O$_{2.6}$F$_{0.4}$ | FM-3M | 0.87 | 3.17 | 1.69 | 361 |
| Example 23 | LiF—Li$_2$O—Mn$_2$O$_3$—MnO$_2$—LiNiO$_2$ | Li$_{1.4}$MnNi$_{0.2}$O$_{2.5}$F$_{0.5}$ | FM-3M | 0.87 | 3.08 | 1.72 | 355 |
| Example 24 | LiF—Li$_2$O—Mn$_2$O$_3$—MnO$_2$ | Li$_{1.5}$MnO$_{2.2}$F$_{0.8}$ | FM-3M | 0.83 | 3.20 | 1.45 | 354 |
| Example 25 | LiF—Li$_2$O—Mn$_2$O$_3$—MnO$_2$ | Li$_{1.5}$MnO$_2$F | FM-3M | 0.83 | 3.00 | 1.50 | 349 |
| Example 26 | LiF—Li$_2$O—Mn$_2$O$_3$—MnO$_2$ | Li$_{1.35}$Mn$_{1.25}$O$_{2.5}$F$_{0.5}$ | FM-3M | 0.87 | 3.00 | 1.80 | 343 |
| Example 27 | LiF—Li$_2$O—Mn$_2$O$_3$—MnO$_2$ | Li$_{1.6}$Mn$_{0.9}$O$_2$F | FM-3M | 0.83 | 3.22 | 1.30 | 334 |
| Example 28 | LiF—Li$_2$O—Mn$_2$O$_3$—MnO$_2$ | Li$_{1.5}$MnO$_{2.5}$F$_{0.5}$ | FM-3M | 0.83 | 3.50 | 1.40 | 323 |
| Example 29 | LiF—Li$_2$O—Mn$_2$O$_3$—MnO$_2$ | Li$_{1.6}$Mn$_{0.9}$O$_{1.8}$F$_{1.2}$ | FM-3M | 0.83 | 3.00 | 1.33 | 321 |
| Example 30 | LiF—Li$_2$O—Mn$_2$O$_3$—MnO$_2$ | Li$_{1.4}$Mn$_{1.2}$O$_{2.2}$F$_{0.8}$ | FM-3M | 0.87 | 2.83 | 1.82 | 315 |
| Example 31 | LiF—Li$_2$O—Mn$_2$O$_3$—MnO$_2$ | Li$_{1.4}$Mn$_{1.1}$O$_2$F | FM-3M | 0.83 | 2.82 | 1.70 | 291 |
| Example 32 | LiF—Li$_2$O—Mn$_2$O$_3$—MnO$_2$ | Li$_{1.4}$Mn$_{1.2}$O$_2$F | FM-3M | 0.87 | 2.67 | 1.90 | 288 |
| Example 33 | LiF—Li$_2$O—Mn$_2$O$_3$—MnO$_2$ | Li$_{1.4}$Mn$_{1.2}$O$_{1.5}$F$_{1.5}$ | FM-3M | 0.87 | 2.25 | 2.20 | 267 |
| Example 34 | LiF—Li$_2$O—Mn$_2$O$_3$—MnO$_2$—LiCoO$_2$—LiNiO$_2$ | Li$_{1.4}$(Mn$_{0.54}$Ni$_{0.13}$Co$_{0.13}$)$_{1.5}$O$_{2.5}$F$_{0.5}$ | FM-3M | 0.87 | 3.08 | 1.72 | 309 |
| Example 35 | LiF—Li$_2$O—Mn$_2$O$_3$—MnO$_2$—LiCoO$_2$—LiNiO$_2$ | Li$_{1.4}$Mn$_{0.4}$Ni$_{0.4}$Co$_{0.4}$O$_{2.5}$F$_{0.5}$ | FM-3M | 0.87 | 3.08 | 1.72 | 296 |

Table 2 shows that the initial discharge capacities of the batteries of Examples 19 to 25 are larger than that of Example 1.

The plausible reason for this is that initially introduced deficiency (that is, "$(x+y)/(\alpha+\beta)$" was less than 1) in Examples 19 to 25 resulted in the formation of more Li diffusion paths in Examples 19 to 25 than in Example 1. This probably increased the capacity.

In addition to the introduced deficiency, a smaller change in the valence of oxygen in Example 19 than in Example 1 (or a larger "$(4y-\beta)/\alpha$", which indicates the valence of oxygen after change, in Example 19 than in Example 1) could result in a more stable structure. This probably increased the capacity.

Table 2 also shows that the initial discharge capacity of the battery of Example 20 is smaller than that of Example 19.

The plausible reason for this is that the addition of Co in Example 20 made it difficult to utilize an oxidation-reduction reaction of oxygen in the charge/discharge process when compared with Example 19.

Table 2 also shows that the initial discharge capacity of the battery of Example 21 is smaller than that of Example 19.

The plausible reason for this is that a decreased Li/Mn ratio in Example 21 resulted in a smaller amount of available Li in Example 21 than in Example 19.

Example 21 was inferior in cycle characteristics to Example 1.

The plausible reason for this is that the amount of fluorine in Example 21 was small (that is, β was less than 0.5).

Table 2 also shows that the initial discharge capacity of the battery of Example 22 is smaller than that of Example 19.

Table 2 also shows that the initial discharge capacity of the battery of Example 24 is smaller than that of Example 19.

The plausible reason for this is that a small "$(x+y)/(\alpha+\beta)$", which indicates initial deficiency, in Example 24 resulted in lower randomness of elements in Example 24 than in Example 19 and unsatisfactory formation of Li diffusion paths. Furthermore, a large change in the valence of oxygen (or a small "$(4y-\beta)/\alpha$", which indicates the valence of oxygen after change) in Example 24 probably destabilized the structure.

Table 2 also shows that the initial discharge capacity of the battery of Example 25 is smaller than that of Example 19.

The plausible reason for this is that a small "$(x+y)/(\alpha+\beta)$", which indicates initial deficiency, in Example 25 resulted in lower randomness of elements in Example 25 than in Example 19 and unsatisfactory formation of Li diffusion paths.

Table 2 also shows that the initial discharge capacity of the battery Example 26 is the same as the initial discharge capacity of the battery of Example 1.

The plausible reason for this is that introduced deficiency and a smaller change in the valence of oxygen in Example 26 stabilized the structure, but a decreased Li/Mn ratio resulted in a decreased amount of available Li.

Table 2 shows that the initial discharge capacities of the batteries of Examples 27 to 29 are smaller than that of Example 1.

The plausible reason for this is that more utilization of an oxidation-reduction reaction of oxygen in Examples 27 to 29 than in Example 1 destabilized the structure. Furthermore, a large change in the valence of oxygen (or a small "$(4y-\beta)/\alpha$", which indicates the valence of oxygen after change) in Examples 27 to 29 probably destabilized the structure.

Table 2 shows that the initial discharge capacity of the battery of Example 30 is smaller than that of Example 1.

The plausible reason for this is that introduced deficiency and a smaller change in the valence of oxygen in Example 30 stabilized the structure, but a decreased Li/Mn ratio resulted in a decreased amount of available Li.

Table 2 shows that the initial discharge capacity of the battery of Example 30 is smaller than that of Example 26.

The plausible reason for this is that the Me valence (Mn valence) was smaller in Example 30 than in Example 26 (that is, "$\{2\alpha+\beta-(3-y)\}/y$" was small). More specifically, the smaller Mn valence probably resulted in insufficient formation of a Mn-oxygen hybrid orbital and insufficient utilization of an oxidation-reduction reaction of oxygen.

Table 2 also shows that the initial discharge capacity of the battery of Example 30 is larger than that of Example 32.

The plausible reason for this is that a larger amount of oxygen in Example 30 than in Example 32 probably resulted in increased utilization of an oxidation-reduction reaction of oxygen.

Table 2 shows that the initial discharge capacity of the battery of Example 31 is smaller than that of Example 1.

The plausible reason for this is that introduced deficiency and a smaller change in the valence of oxygen in Example 31 stabilized the structure, but a decreased Li/Mn ratio resulted in a decreased amount of available Li.

Table 2 shows that the initial discharge capacity of the battery of Example 31 is smaller than that of Example 25.

The plausible reason for this is that the Me valence (Mn valence) was smaller in Example 31 than in Example 25 (that is, "$\{2\alpha+\beta(3-y)\}/y$" was small) More specifically, the smaller Mn valence probably resulted in insufficient formation of a Mn-oxygen hybrid orbital and insufficient utilization of an oxidation-reduction reaction of oxygen.

Table 2 shows that the initial discharge capacity of the battery of Example 32 is smaller than that of Example 1.

The plausible reason for this is that introduced deficiency and a smaller change in the valence of oxygen in Example 32 stabilized the structure, but a decreased Li/Mn ratio resulted in a decreased amount of available Li.

Table 2 shows that the initial discharge capacity of the battery f Example 32 is smaller than those of Examples 26 and 30.

The plausible reason for this is that the Me valence (Mn valence) was smaller in Example 32 than in Examples 26 and 30 (that is, "$\{2\alpha+\beta-(3-y)\}/y$" was small). More specifically, the smaller Mn valence probably resulted in insufficient formation of a Mn-oxygen hybrid orbital and insufficient utilization of an oxidation-reduction reaction of oxygen.

Table 2 shows that the initial discharge capacity of the battery of Example 33 is smaller than that of Example 1.

The plausible reason for this is that the Me valence (Mn valence) was smaller in Example 33 than in Example 1 (that is, "$\{2\alpha+\beta-(3-y)\}/y$" was small). More specifically, the smaller Mn valence probably resulted in insufficient formation of a Mn-oxygen hybrid orbital and insufficient utilization of an oxidation-reduction reaction of oxygen.

Table 2 also shows that the initial discharge capacity of the battery Example 33 is smaller than that of Example 32.

The plausible reason for this is that a smaller amount of oxygen in Example 33 than in Example 32 probably resulted in decreased utilization of an oxidation-reduction reaction of oxygen.

Table 2 shows that the initial discharge capacities of the batteries of Examples 34 and 35 are larger than that of Example 13.

The plausible reason for this is that initially introduced deficiency (that is, "$(x+y)/(\alpha+\beta)$" was less than 1) in Examples 34 and 35 resulted in the formation of more Li diffusion paths in Examples 34 and 35 than in Example 13. Furthermore, a smaller change in the valence of oxygen in Examples 34 and 35 than in Example 13 could result in a more stable structure. This probably increased the capacity.

Table 2 also shows that the initial discharge capacities of the batteries of Examples 34 and 35 are smaller than that of Example 19.

The plausible reason for this is that the addition of Ni and Co in Examples 34 and 35 made it difficult to utilize an oxidation-reduction reaction of oxygen in the charge/discharge process when compared with Example 19.

A positive-electrode active material according to the present disclosure can be suitable for a positive-electrode active material of batteries, such as secondary batteries.

What is claimed is:

1. A positive-electrode active material comprising a compound that has a crystal structure belonging to a space group FM-3M and is represented by the composition formula (1):

$$Li_xMe_yO_\alpha F_\beta \qquad (1)$$

wherein Me denotes one or two or more elements selected from the group consisting of Mn, Co, Ni, Fe, and Al, and the following conditions are satisfied,
$1.3 \le x \le 2.2$,
$0.8 \le y \le 1.3$,
$1 \le \alpha \le 2.93$,
$0.07 \le \beta \le 2$, and
$1.5 \le (4y-\beta)/\alpha \le 2.2$.

2. The positive-electrode active material according to claim 1, satisfying $0.8 \le (x+y)/(\alpha+\beta) \le 1$.

3. The positive-electrode active material according to claim 2, satisfying $2.5/3 \le (x+y)/(\alpha+\beta) \le 2.6/3$.

4. The positive-electrode active material according to claim 1, satisfying $2.83 < \{2\alpha+\beta-(3-y)\}/y \le 3.50$.

5. The positive-electrode active material according to claim 1, wherein Me denotes one element selected from the group consisting of Mn, Co, Ni, and Fe, a solid solution composed of Ni, Co, and Mn, a solid solution composed of Ni, Co, and Al, a solid solution composed of Mn and Co, or a solid solution composed of Mn and Ni.

6. The positive-electrode active material according to claim 1, satisfying $1.79 \le x \le 2.18$.

7. The positive-electrode active material according to claim 6, satisfying $1.89 \le x \le 2$.

8. The positive-electrode active material according to claim 1, satisfying $0.5 \le \beta \le 2$.

9. The positive-electrode active material according to claim 8, satisfying $0.79 \le \beta \le 1$.

10. A battery comprising:
    a positive electrode containing the positive-electrode active material according to claim 1;
    a negative electrode; and
    an electrolyte.

11. The battery according to claim 10, wherein the positive electrode has a positive-electrode active material layer containing 50 wt % or more of the positive-electrode active material.

12. The battery according to claim 10, wherein the negative electrode contains a negative-electrode active material with lithium adsorption and desorption characteristics, and the electrolyte is a non-aqueous electrolyte solution.

* * * * *